(No Model.)
J. N. DEWEY.
CAR AXLE LUBRICATOR.
No. 414,195. Patented Nov. 5, 1889.
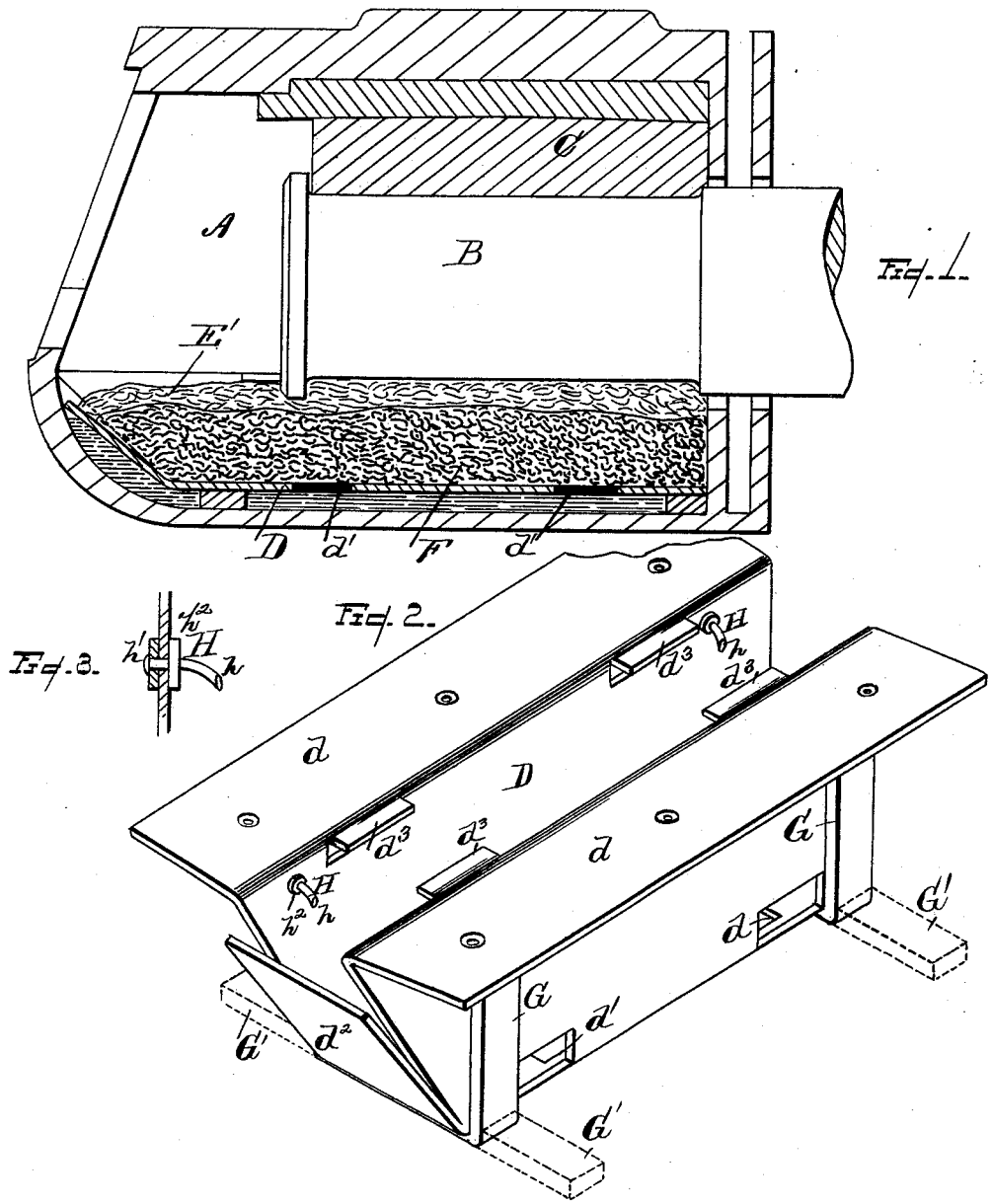
WITNESSES
Samuel E. Thomas
W. H. Chamberlin
INVENTOR
Jesse N. Dewey,
By Wells W. Leggett & Co.
Attorneys.

UNITED STATES PATENT OFFICE.

JESSE N. DEWEY, OF TOLEDO, OHIO.

CAR-AXLE LUBRICATOR.

SPECIFICATION forming part of Letters Patent No. 414,195, dated November 5, 1889.

Application filed January 10, 1889. Serial No. 295,983. (No model.)

*To all whom it may concern:*

Be it known that I, JESSE N. DEWEY, a citizen of the United States, residing at Toledo, county of Lucas, State of Ohio, have invented a certain new and useful Improvement in Car-Axle Lubricators; and I declare the following to be a full, clear, and exact description of the invention, such as will enable others skilled in the art to which it pertains to make and use the same, reference being had to the accompanying drawings, which form a part of this specification.

My invention has for its object the production of a cheap and durable lubricator for car-axle journals and one that may be readily removed and replaced in the journal-box.

In the drawings, Figure 1 is a perspective view of the pan for holding the absorptive material. Fig. 2 is a sectional view of a journal-box with my lubricator located therein, the latter being also in section. Fig. 3 is a detail view of the rivet used to fasten the rib and to hold waste in place in the pan.

In carrying out my invention, A is the journal-box, B the journal, and C the brass journal-bearing of a car.

D is a removable pan, constructed, preferably, of galvanized iron and adapted to rest on the bottom of the box, and is provided with flanges $d$, which extend out from the upper edges of the pan and serve a double purpose: First, they act as braces to keep the pan in the center of the box and always underneath the axle, and, second, when the lubricant is poured into the box these flanges serve to keep it from flying up and working out through the opening at the front of the box, as is often the case when the car is in motion. If desired, the flanges $d$ may be punctured, and a small quantity of the oil be thus allowed to ooze up and run down into the waste.

$d'$ are openings through the sides and bottom of the pan for the free circulation of the lubricant. These openings may be any desired size or shape, and may be any number desired.

In order to more thoroughly brace the pan after it has been inserted in the box, it may be provided with horizontal braces $G'$, attached to the bottom of the pan and extending out to the sides of the journal-box. The use of these braces is of course optional. At the point where the flanges $d$ extend outward from the sides of the pan may, if desired, be located small fins $d^3$. These will serve to keep the waste in the pan and prevent it from working up on the flanges.

$d^2$ is a flange which extends upward from the bottom of the pan, and is adapted to prevent the lubricant from flying up at the front of the pan.

F represents a mass of metal shavings, wire matting, or other similar substance, which is placed in the pan, and $E'$ is a mass of the cotton waste ordinarily used in journal-boxes, which is placed on top of the matting and adapted to rest against the under side of the journal. Of course, cloth or other material may be substituted for the waste, although I prefer to use the latter.

G represents ribs on the outer surfaces of the pan for strengthening and stiffening the same, and H are rivets, constructed as shown, with one end $h$ beveled to a point and the other end $h'$ adapted to be passed through the pan and rib and riveted on the outside, the shoulder $h^2$ resting against the inner surface of the pan. Thus the wire matting may be pressed down in the pan and held there by the prongs $h$.

It will be seen that by partially filling the journal-box with the lubricant $F'$ and giving it free access to the pan through the openings $d'$ it will be drawn by capillary attraction up through the wire and cotton waste to the journal. Thus a sufficient quantity of oil is constantly fed to the journal, and yet it is not wasted.

It will be observed that by thus providing a removable pan in which the waste may be inserted and kept always under the journal the use of a large quantity of cotton waste is obviated, and thus an important item in the operating expense of the railroad is greatly reduced; also, this pan can be readily inserted in any ordinary journal-box, and does not require an especially-constructed box, as is the case with some of the devices already patented.

What I claim is—

1. A car-axle lubricator consisting of a removable pan adapted to hold material whereby the lubricant is fed to the axle by capillary attraction, said pan located immediately underneath the axle and provided with flanges extending from its upper edges to the sides of the journal-box, and with the flange $d^2$ extending from the pan to the front of the journal-box, said pan also provided with orifices whereby the lubricant may have free access to the pan, substantially as described.

2. The within-described device for holding a small quantity of cotton waste or analogous material adjacent to the car-axle, consisting of a removable pan provided with outwardly-projecting flanges adapted to steady the pan and keep it in the center of the box, orifices in the sides of the pan to admit the lubricant, and the prongs on the inner surface of the pan, substantially as described.

In testimony whereof I sign this specification in the presence of two witnesses.

JESSE N. DEWEY.

Witnesses:
W. H. CHAMBERLIN,
L. A. DOELTY.